United States Patent [19]
James et al.

[11] Patent Number: 5,305,635
[45] Date of Patent: Apr. 26, 1994

[54] SYSTEM AND METHOD FOR FILTERING A MISFIRE DETECTING DATA STREAM TO YIELD OPTIMUM MEASUREMENT OF MISFIRE RATE

[75] Inventors: John V. James, Walled Lake; Nathan R. Soderborg; Timothy M. Feldkamp, both of Ann Arbor, all of Mich.

[73] Assignee: Ford Motor Company, Dearborn, Mich.

[21] Appl. No.: 42,257

[22] Filed: Apr. 2, 1993

[51] Int. Cl.$^5$ .......................................... G01M 15/00
[52] U.S. Cl. ...................................... 73/116; 123/419
[58] Field of Search .................... 73/118.1, 116, 117.3; 123/419; 364/431.08

[56] References Cited

U.S. PATENT DOCUMENTS

| | | | |
|---|---|---|---|
| 5,044,195 | 9/1991 | James et al. | 73/117.3 |
| 5,095,742 | 3/1992 | James et al. | 73/116 |
| 5,109,695 | 5/1992 | James et al. | 73/117.3 |
| 5,193,513 | 3/1993 | Marko et al. | 123/571 |
| 5,222,392 | 6/1993 | Baba et al. | 73/116 |

OTHER PUBLICATIONS

*Exponentially Weighted Moving Average Control Schemes: Properties and Enhancements*, James M. Lucas, Engineering Department, E. I. du Pont de Nemours and Company, Newark, Del. 19714-6090 and Michael S. Saccucci, Dept. of Quantitative Methods, Drexel University, Philadelphia, Pa. 19104, Technometrics, Feb. 1990, vol. 32, No. 1.
*Optimal Properties of Exponentially Weighted Forecasts*, John F. Muth, Carnegie Institute of Technology, Journal of American Statistical Association, 1960, vol. 55.
*Misfire Detection by Evaluating Crankshaft Speed-A Means to Comply with OBDII*, Martin Klenk and Winifried Moser of Robert Bosch GMBH and Werner Mueller and Wolfgang Wimmer of Audi AG, SAE Technical Paper Series 930399, International Congress and Exposition, Detroit, Mich., Mar. 1-5, 1993.
*The Exponentially Weighted Moving Average*, J. Stuart Hunter, Journal of Quality of Technology, vol. 18, No. 4, Oct., 1986, 179 Longview Drive, Princeton, N.J. 08540.
*Control Chart Tests Based On Geometric Moving Averages*, S. W. Roberts, Bell Telephone Laboratories, Technometrics, vol. 1, No. 3, Technometrics, Aug., 1959.

*Primary Examiner*—Jerry W. Myracle
*Attorney, Agent, or Firm*—Mark Mollon; Roger L. May

[57] ABSTRACT

System and method for filtering a misfire data stream having numerical values that indicate whether a firing of a cylinder was a misfire or a proper firing, to yield an optimum measurement misfire-rate for accurate and rapid determination of whether an engine is misfiring beyond a threshold level. The method includes measuring firings of the cylinder during operation of the engine to produce measured cylinder firing signals, processing the measured cylinder firing signals received to produce a current misfire detection data stream of first and second logic signals, wherein the first logic signals indicate a current misfire condition and the second logic signals indicate a current normal firing of the engine, combining the current misfire detection data stream with previously detected and stored measured data representing an engine misfire rate, replacing the previously stored measured data by the combined current and previously stored data to produce a misfire rate output measurement, storing threshold values, comparing the combined current and previously stored data and the stored threshold values, generating an actuation signal if the combined current and previously stored data signal exceeds the stored threshold values, and indicating a misfire condition in the engine upon receiving the actuation signal.

7 Claims, 11 Drawing Sheets

SYSTEM AND METHOD FOR FILTERING A MISFIRE DETECTING DATA STREAM TO YIELD OPTIMUM MEASUREMENT OF MISFIRE RATE

BACKGROUND OF THE INVENTION

1. Field of the Invention

The present invention relates in general to a system and method for filtering a misfire-detection data-stream received from a multi-cylinder combustion engine, and more specifically to filtering a misfire data stream received during engine operation to yield an optimum measurement misfire-rate for accurate and rapid determination of the extent to which an engine is misfiring.

2. Related Art

Most automobiles employ a catalytic converter to reduce the amount of pollutants in engine exhaust. However, when a cylinder misfires (i.e., no or an incomplete combustion occurs) unburned fuel escapes into the exhaust system. This causes two problems: 1) tailpipe emissions of pollutants increase; and 2) high amounts of unburned fuel enter the catalytic converter causing excessive heat, which can permanently damage or destroy the catalytic converter.

The California Air Resources Board (CARB), as well as other state and federal agencies, have identified engine misfires as a contributor to vehicle emissions and a cause of poor catalyst performance. They have instituted regulations that require misfire detection systems be implemented in automobile on-board diagnostics to alert drivers (typically on the instrument panel), when a misfire measurement rate exceeds a threshold mandated by such agencies.

The aim of the regulations is to determine an accurate measurement of the misfire rate and to alert the driver as soon as possible when a misfire rate exceeds thresholds enumerated in the regulations. There are three important parameters to consider in order to carry out the regulations established by CARB and other agencies (hereinafter "CARB"). They are as follows: 1) threshold rate $R_{th}$ (set by CARB—the rate of misfire determined to cause emissions that are too high; 2) time constant (set by CARB—the length of a "window" over which measurements of the average misfire rate is taken); and 3) false alarm rate $R_{fa}$, which represents a frequency of occurrence of normal firings which are incorrectly classified as misfirings. It should be noted that the false alarm rate $R_{fa}$ is calculated internally by misfire detection systems and should not be confused with false indications of failures, which occurs when a misfire detection system alerts an operator of a failure (that is, the misfire measurement rate exceeding the threshold) based on an incorrect determination that the misfire rate exceeds a predetermined threshold (such an incorrect determination, however, may be due to a high false alarm rate $R_{fa}$).

CARB's desire to have the threshold rate ($R_{th}$) as low as possible to minimize pollution is a basic competing interest with the automobile manufacturers' desire to have $R_{th}$ higher to avoid false indications of failure. Additionally, CARB prefers a short time constant (to obtain measurements quickly to avoid irreversible damage to the catalytic convert), whereas automobile manufactures prefer a longer time constant (to obtain accurate measurements). Long time constants provide measurements taken over a large number of samples and provide a more accurate estimation of the true misfire rate, but provide a slower response time when an unacceptable misfire rate occurs. Whereas short time constants provide a fast response time to unacceptable misfire rates, they often increase the likelihood of a false indication of failure. The reason is that to obtain a fast response a smaller measurement sample is used to evaluate misfire-rate. Temporary statistical fluctuations that occur during routine driving conditions are not filtered out of the true misfire-rate measurement and thus may appear to represent an unacceptable misfire rate. Whereas in-fact it is a false indication of failure.

Both the regulatory agencies and automobile manufacturers desire a low indication of failure. False indications are very costly to consumers and automobile manufactures in terms of unnecessary service costs (possible recall), wasted time, and so forth. Both regulatory agencies and automobile manufactures require a fast response time to misfire rates beyond threshold limits. Therefore, there is a need to measure misfire-rate accurately and rapidly to identify when engine misfire rates exceeds threshold limits.

SUMMARY OF INVENTION

The present invention is directed to a system and method for filtering a misfire data stream received during engine operation to yield an optimum measurement misfire-rate for accurate and rapid determination of the extent to which an engine is misfiring. The present invention responds significantly faster than previous techniques to sudden steep increases in automobile misfire rate. And for purposes of misfire detection, the present invention significantly minimizes the undesirable effects of false alarms caused by random noise, over previous techniques.

More particularly, the purpose of the present invention is to provide a more optimum filtering of a data stream containing successive misfire evaluations of individual engine firings, in order to yield a more accurate and responsive measure of the current misfire rate. The present invention is superior to conventional means for determining misfire rate (referred to hereafter as the Fixed Window Average or "FWA" technique), which relies on arbitrarily dividing the data stream into segments (referred to hereafter as "windows") of equal length and determining the misfire rate for each of the windows using the number of misfires occurring in the respective windows. Typically, it is desirable to set the window length below certain predetermined bounds such that the filter responds rapidly to sudden changes in misfire rate. Conversely, it is desirable to set the window length to a sufficiently high value (or length) so as to prevent excessive swings in the FWA misfire rate output due to the random (or nearly random) arrival of infrequent, yet inevitable, errors in the data stream being filtered. Conventionally, FWA filters are generally inefficient in resolving this trade-off between the conflicting requirements of timely response and immunity to false alarms.

In contrast to FWA filters, the present invention includes a Geometric Moving Average (GMA) filter having a rapid response. The rapid response of the GMA filter is due to its more frequent updating of the misfire rate output. Instead of calculating a new misfire rate over successive intervals (as does the FWA), the GMA filter uses the most recent outcome in the misfire detection data stream to modify its current (or running) estimate of the misfire rate. The single adjustable parameter of the GMA filter is its time constant, which is generally analogous to the window length in the FWA. However, unlike the FWA, the GMA filter contains no arbitary starting and stopping points of rate calculation. Rather, the GMA filter is an ongoing, smoothly varying response to the "average" of the input data stream over the recent history. In this regard the GMA filter is similar in effect (in a mathematical sense) to an electronic RC low-pass filter having a characteristic time constant. It should be noted that the GMA filter is not similar to the physical components of a resistor and a capacitor.

It is shown herein that, for sudden changes in the frequency of misfires in the incoming data stream, the GMA filter misfire rate output reaches a target threshold rate more rapidly than does the FWA filter, except when the incoming rate in the data stream is only slightly higher than the target rate. In fact, it is precisely this slower response under such conditions which is at the heart of the GMA's superior insensitivity (and increased reliability) to random errors in the incoming data stream. Thus, a natural characteristic of the GMA is to require a much longer duration of misfires in the incoming stream before its output reaches a predetermined threshold if the incoming misfire rate is only marginally above that threshold.

Also presented herein is an alternate form of the GMA filter which operates in a background loop of an engine control strategy. In this alternate embodiment, the background GMA filter updates its output less frequently than once per firing, but still updates its output much more frequently than does the FWA for most reasonable system parameters.

For diagnostic applications designed to track the misfire rate separately for each engine cylinder, the GMA filter of the present invention includes a set of filters, one per cylinder (plus one for all cylinders in total). These individual cylinder filters provide diagnostic indentification of the faulty cylinder(s) in the event that the total misfire rate rises above a predetermined threshold.

Figure 1:
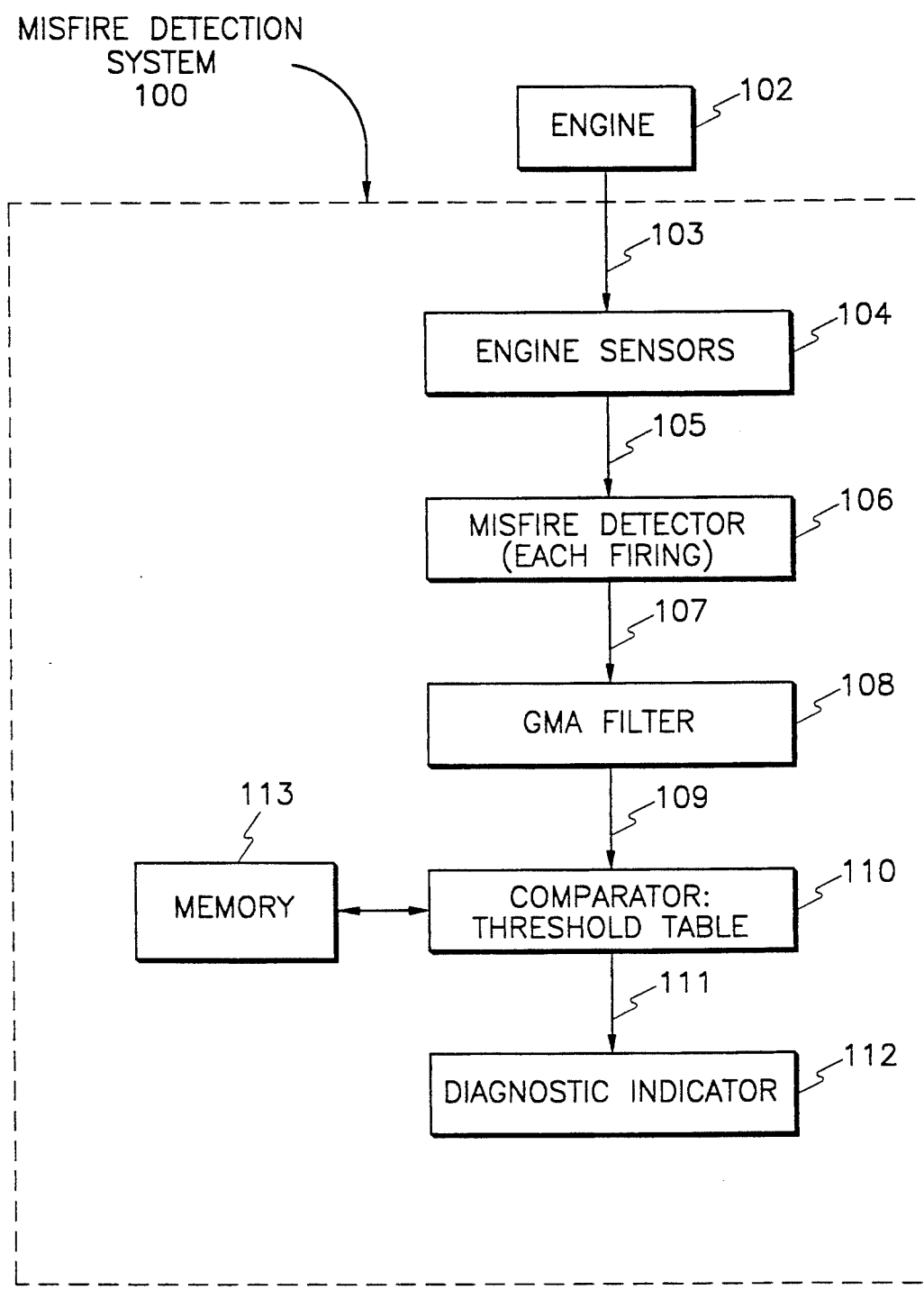
FIG. 1 is a block diagram of a misfire detection system in accordance with a preferred embodiment of the present invention.

The left-most digit of a reference number identifies the drawing in which the reference number first appears.

DETAILED DESCRIPTION OF THE PREFERRED EMBODIMENTS

1.0 Misfire Detection System

FIG. 1 is a high level, data flow block diagram of a misfire detection system 100 in accordance with a preferred embodiment of the present invention. The misfire detection system 100 includes engine sensors 104, a misfire detector 106, a filter 108, a comparator threshold table 110, and a diagnostic indicator 112. The misfire detection system 100 may also include a memory 113 to store any pertinent data such as misfire historical information, diagnostic information, intermediate processing results, etc. The memory 113 may be implemented using any well known storage device, such as a random access memory (RAM). Elements 103, 105, 107, 109 and 111 in FIG. 1 represent data flow direction between components of the present invention, and may be implemented as wires, such as electrical bus wires, which transport electrical signals. Alternatively, one or more of elements 103, 105, 107, 109 and 111 may represent communication (or data flow) between software routines, particularly when the present invention (or components of the present invention) is implemented as a computer-controlled process. The misfire detection system 100 monitors an engine 102 to determine whether the engine 102 is misfiring beyond acceptable, predetermined misfire threshold rates set by regulatory agencies, such as CARB.

The overall operation of the misfire detection system 100 will now be generally described with reference to FIG. 1 and FIG. 2, which illustrates a misfire detection process 200 in accordance with the preferred embodiment of the present invention. For purposes of illustrating the present invention, the engine 102 is herein considered to be a 6-cylinder combustion engine of a type typically employed in cars and light trucks having catalytic converters. It should be understood, however, that the misfire detection system 100 can be employed to monitor other combustion engine designs (e.g., 4, 8, and greater number of cylinders).

The engine sensors 104 are connected to the engine 102 via sensing wires 103. Referring to FIG. 2, in step 202, the engine sensors 104 measure the effects of engine firings and produce signals which are characteristic of the firings. In the preferred embodiment, the engine sensors 104 are well known, commercially available engine position sensors attached to the crank shaft (not shown) of engine 102. Other types of well known, commercially available sensors, such as exhaust pressure sensors and/or ionization detectors, can also be employed. The structure and operation of the engine sensors 104 are generally known to those skilled in the art.

Figure 7:
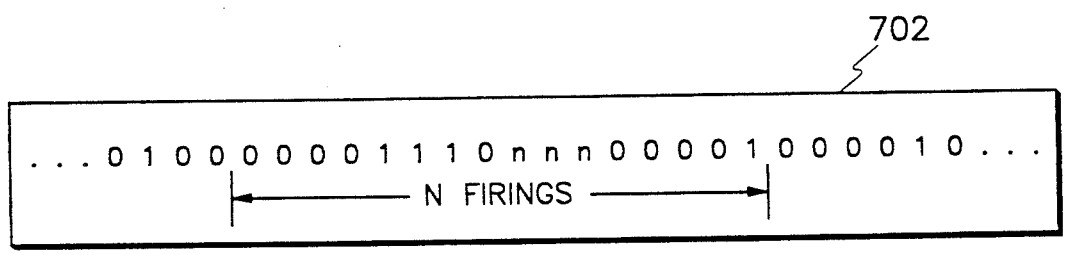
FIG. 7 illustrates a sample misfire rate data stream generated by the misfire detector.

In step 204, the misfire detector 106 receives the characteristic misfire signals from the engine sensors 104 via bus 105. The misfire detector 106 processes in a well known manner the signals received from the engine sensors 104 to identify the absence or presence of misfire at every engine firing. Preferably, after each engine firing the misfire detector 106 generates an output value equal to either a digital value "1" (indicating a misfire), a digital value "0" (indicating no misfire), or another predetermined value represented herein as "n" or "NT" (indicating that misfire test data was inconclusive by the misfire detector 106 during the engine firing). The output values produced by the misfire detector 106 during consecutive engine firings are sent from the misfire detector 106 to the filter 108 as a misfire evaluation data stream via wire 107. Although not shown in FIG. 1, the misfire evaluation data stream 107 could be stored in memory 113 for future processing. FIG. 7 illustrates a sample misfire evaluation data stream 702 generated by the misfire detector 106 (other numerical representations are contemplated, such as floating-point and integer values). The misfire detector 106 is preferably implemented as a microprocessor operating in accordance with a computer program. The preferred microprocessor is an 8096 from Intel Corp. of Santa Clara, Calif., U.S.A. Alternatively, the misfire detector 106 may be implemented in hardware using integrated circuits. In either case, the misfire detector 106 may be implemented using techniques well known to those skilled in the art, such as those described in U.S. Pat. No. 5,109,695 to James et al. and U.S. Pat. No. 5,044,194 to James et al., which are herein incorporated by reference in their entireties.

In step 206, the filter 108 receives the misfire evaluation data stream 107 from the misfire detector 106 via wire 107. As described further below, the filter 108 analyzes the misfire rate data stream 107 to produce a misfire rate output measurement indicative of a misfire rate of a particular cylinder. The filter 108 may also, or may alternatively, produce a total misfire rate of the entire engine 102. The misfire rate information generated by the filter 108 is sent to the comparator via wire 109.

In a decisional step 208, the comparator 110 refers to a threshold table (not explicitly shown) to determine if the total misfire rate (received from the filter 108 via the wire 109) exceeds a predetermined misfire rate threshold. As indicated above, the threshold may be set by a regulatory agency, such as CARB. The comparator 110 and threshold table are preferably implemented in software, but may alternatively be implemented in hardware. If, in step 208, the comparator 110 determines that the total misfire rate does not exceed the threshold, then the misfire detection system 100 continues monitoring the misfires of the engine 102 by returning to step 202 via the "NO" path from block 208. If, instead, the comparator 110 determines that the total misfire rate exceeds the threshold, then the comparator 110 sends an activation signal to the diagnostic indicator 112 via bus wire 111.

In step 210, the diagnostic indicator 112 upon receiving the activation signal provides an indication that engine 102 is malfunctioning. The indicator 112 is typically a visual light on the automobile's instrument panel (not shown), but may alternatively be, for example, an audible sound, such as a beep. Ideally, the vehicle operator will service the vehicle upon receiving the malfunction signal from the diagnostic indicator 112. The misfire detection system 100 continues to monitor misfires of the engine 102 by returning to step 202 after the completion of step 210.

2.0 Filters

Ideally, the misfire detector 106 would correctly identify the absence or presence of misfire at every engine firing. However, the precision with which misfire can be realistically detected by the misfire detector 106 depends upon the signal-to-noise ratio of both the signals sent from the engine 102 to the engine sensors 104 via wire 103, and the signals sent from the engine sensors 104 to the misfire detector 106 via wire 105. The signal-to-noise ratio of these signals vary with engine speed, engine load, and other operating parameters. Additionally, it is possible that a streak of closely spaced false alarms might occasionally occur causing a conventional misfire detection system to declare a failure even though the "average" false alarm rate is below the predetermined threshold. In order to avoid incorrect readings of the misfire rate due to the above problems, a filter such as filter 108 of the present invention is required.

In an effort to most efficiently obtain the most accurate misfire rate measurement, CARB proposes computing the average number of misfires in successive, non-overlapping windows, wherein each of the windows is a fixed number of firings in length ("no test" outputs would not count as part of a window nor contribute to the average). Under the CARB proposal, failure occurs as soon as the average measurement exceeds the threshold in any window. The CARB proposal is referred to herein as the Fixed Window Average (FWA) technique and is illustrated, for example, in FIG. 1b, wherein the data stream is partitioned into windows 160.

Conventional misfire detection systems employ filters which operate in accordance with the FWA technique. However, there are a number of problems associated with FWA filters and, consequently, with misfire detection systems that use FWA filters. In particular, FWA filters are not sufficiently accurate in that they do not provide optimum immunity to false indications of failure arising from false alarms in the incoming data stream. Additionally, FWA filters tend to be slow to respond to sudden changes in the actual misfire rate.

The FWA filters will now be described in greater detail.

Computational Requirements of FWA Filters

Generally, a conventional FWA filter is implemented using two counters: a window counter which is reset at the completion of each window, and a misfire counter which simultaneously counts the misfires in each window. At each engine firing, the FWA filter performs the following steps if the misfire detector (or comparable device) returns a value of 1 or 0. First, the FWA filter increments the window counter by 1, and then increments the misfire counter by 1 if it is determined that a misfire occurred. Also, if the window counter equals a predetermined threshold value N, then the FWA filter evaluates the possibility of failure. More particularly, if the misfire counter divided by N is greater than $R_{th}$, then the FWA filter declares a failure. Otherwise, the FWA filter resets both the window counter and the misfire counter to 0.

Thus, after each engine firing, the FWA filter performs at least two logical evaluations and one or two integer additions for each engine firing.

Response Time of the FWA Filter

The speed with which a misfire detection system responds to a sudden increase in the misfire rate is an important factor in protecting a car engine's catalytic converter from damage caused by exposure to high levels of unburned fuel. Suppose that, after operating without misfire for a time, a car engine suddenly begins misfiring at a constant (periodic) rate of $R_m > R_{th}$. The number of engine firings which occur between the onset of misfire and the declaration of failure (that is, the response time) by conventional systems using a FWA filter depends not only on the ratio $R_m/R_{th}$, but also on the location in a window where misfire begins.

If a sudden increase in the misfire rate begins near the end of a window, it is possible that so few misfires will occur by the end of the window that the misfire count at window's end will not exceed the threshold. The detector will then need to step through another entire window before the value of the FWA will be high enough to cause failure.

Let t denote response time (i.e., the number of firings between the onset of misfire and the indication of failure). If misfire begins with d firings remaining in the first window, then either $t=d$ or $t=N+d$ (where N represents the number of firings in the next window). $t=d$ if and only if the value of the FWA after the first window is greater than $R_{th}$, i.e., $R_m(d/N) \geq R_{th}$. Thus, if the number of firings d remaining in the first window is greater than $\Delta = \lceil N(R_{th}/R_m) \rceil$, then $t=d$; otherwise $t=N+d$. (the brackets $\lceil \ \rceil$ denote the ceiling function which returns the least integer greater than or equal to its argument.) Assuming that d is equally likely to be any integer from 0 to $N-1$, the average time to failure for the FWA is given by $$ave(t) = \frac{1}{N}\left(\sum_{d=0}^{\Delta-1}(d+N) + \sum_{d=\Delta}^{N-1} d\right) \quad (2.1)$$

$$= \frac{1}{N}\left(\sum_{d=0}^{N-1} d + \sum_{d=0}^{\Delta-1} N\right)$$

$$= \frac{1}{N} + \left(N(N-1)\frac{1}{2} + \Delta N\right)$$

$$= \frac{N}{2} + \left\lceil \frac{R_{th}}{R_m} N \right\rceil - \frac{1}{2}.$$

The worst possible response time occurs when misfire begins with $\Delta - 1$ firings remaining in a window, in which case the number of firings to failure is $$\max(t) = N + \Delta - 1 = N + \quad (2.3)$$

$$\left\lceil N\frac{R_{th}}{R_m} \right\rceil - 1 \approx \left(1 + \frac{R_{th}}{R_m}\right)N.$$

On the other hand, the best possible response time results when misfire begins with $\Delta$ firings remaining in a window, in which case the number of firings to failure is $$\min(t) = \Delta \approx \frac{R_{th}}{R_m} N. \quad (2.4)$$

Note that the average response time lies midway between the best and worst cases.

$$ave(t) \approx \left(\frac{1}{2} + \frac{R_{th}}{R_m}\right)N. \quad (2.2)$$

Protection Against False Indication of Failure

The misfire value calculated by a FWA based system for a particular window is not necessarily the same as the true misfire rate of the engine. Rather, the FWA-calculated misfire rate is the average number of misfires reported by the misfire detector, and therefore, includes all false alarms. If $R_m$ denotes the true misfire rate and $R_{fa}$ denotes the rate of false alarms then the FWA misfire rate value should ideally be close to $R_m + R_{fa}$ in any given window. However, typical cars each have approximately a billion lifetime engine firings. If $R_{fa}$ is less than but close to $R_{th}$, then the FWA-based system is likely to return a value above $R_{th}$ very early in a car's lifetime. Even if $R_{fa}$ is small relative to $R_{th}$, the number of windows covered in the car's lifetime might be high enough to expect one or more false failure indications in that lifetime.

The sensitivity of the misfire detector to false alarms depends on three parameters: false alarm rate $R_{fa}$, threshold rate $R_{th}$, and window size N. The best method for decreasing the likelihood of false failure indication is to improve the accuracy of the detector 106 and thereby reduce the false alarm rate. But after all known improvements are implemented, there is a need to examine other techniques of minimizing false indication of misfire.

One solution would be to increase the FWA window size. A large window size means that a large sample of firings is used for computing the average misfire rate, and the law of averages implies that as N gets larger, the FWA rate will remain closer to $R_m + R_{fa}$. In this case, as long as $R_m + R_{fa}$ is small relative to the $R_{th}$, the probability of failure is small. Another solution would be to raise the threshold rate. Fewer failures would occur because it would be more difficult to cross the threshold.

However, both of these measures are counterproductive to maintaining air quality. Any increase in window size causes a corresponding increase in response time and likelihood of catalyst damage. Any increase in the threshold rate allows higher levels of pollution without activating the on board warning indications.

Geometric Moving Average Filter (Present Invention)

The filter 108 of the present invention operates in accordance with a Geometric Moving Average (GMA) filter technique. As described in detail below, since the GMA filter technique is used, the misfire detection system 100 of the present invention yields misfire measurement results faster and more accurately than systems employing conventional filtering techniques (such as the FWA technique) with significant reduction in the possibility of false indication of failure. Filter 108 will now be referred to as GMA filter 108. GMA filter 108 may be implemented as an integrated circuit in hardware or, as in the preferred embodiment, as a computer implemented process using a 8096 processor (not shown) from Intel Corp., Santa Clara, Calif., U.S.A.

In operation, GMA filter 108 measures the misfire rate of each cylinder along with the engine's overall measured misfire rate 109. The misfire rate 109 as reported by the GMA filter 108 is a weighted average of all previous misfire detector output signals. The precise form of the average depends on a time constant parameter $\tau$ whose role is somewhat analogous to the window length used in the FWA filter, i.e., increasing $\tau$ improves the protection against false alarms, but degrades the response time. $\tau$ is represented by the following relationships:

$$\alpha = \frac{1}{\tau},$$

and $\alpha' = n\alpha$, where n is the number of engine cylinders. Preferably, $\tau$ is set approximately equal to the window length N of a comparable FWA filter.

Figure 3:
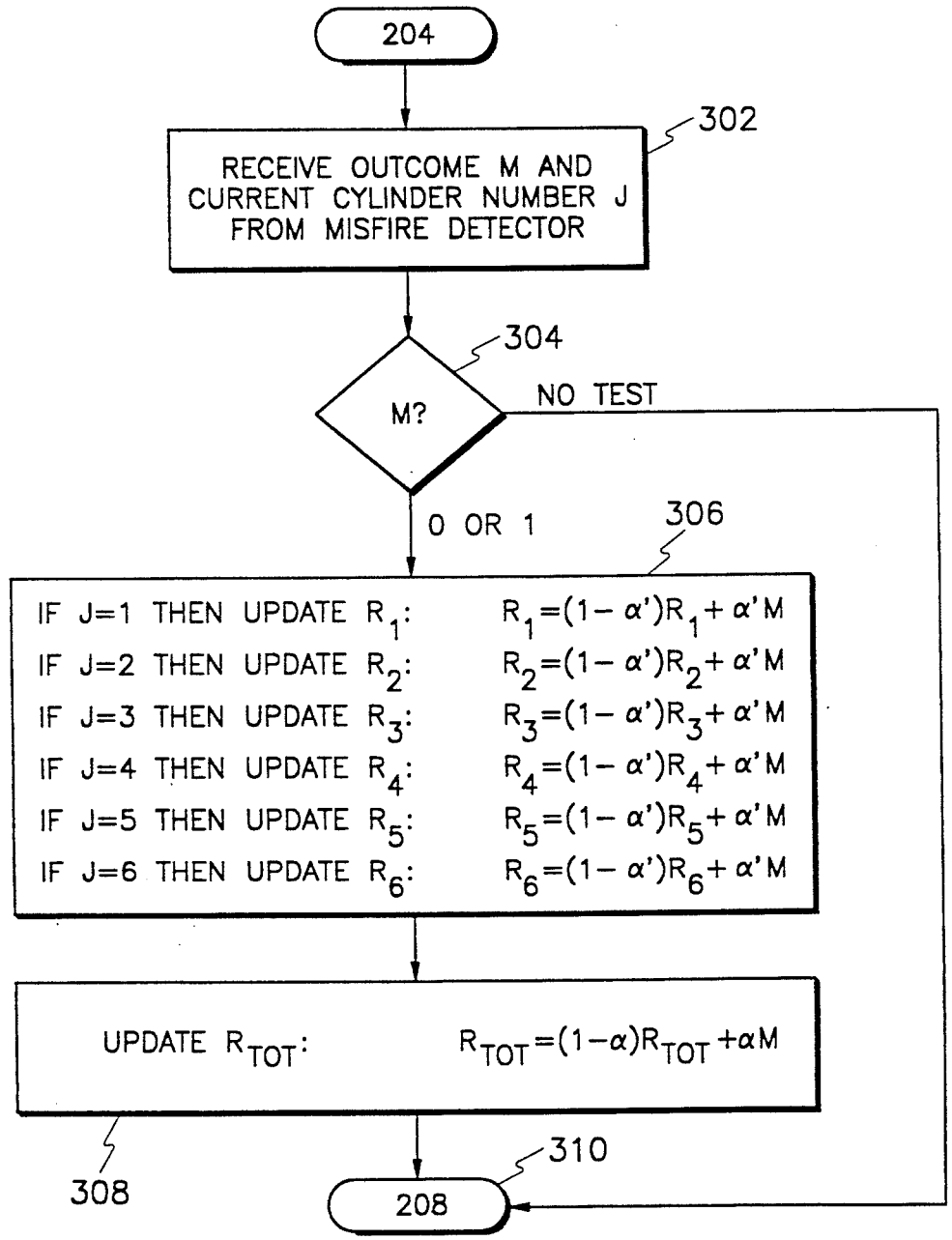
FIG. 3 is a flow chart illustrating the process for a GMA filter according to the first embodiment of the present invention.

The GMA filter 108 operates in accordance with a GMA filter process 300 depicted in FIG. 3. A measured misfire rate $R_J$ is maintained for each of the engine cylinders denoted J=1 to 6 (for a 6 cylinder engine). Upon engine start-up, the misfire rates $R_J$ are initialized to 0. As the car is driven, the misfire rates $R_J$ associated with the cylinder J=1 to 6 are immediately updated as the respective cylinders are fired. The GMA filter process 300 represents the operation of the GMA filter 108 after one of the cylinders is fired. In particular, in step 302, the misfire detector 106 generates a misfire value M for the particular cylinder which is fired just prior to the operation of step 302. The misfire value M is preferably either "0" for no misfire, "1" for a misfire, or "NT" for no test. The misfire detector 106 generates a value of the "NT" when engine conditions are so noisy as to render unreliable misfire measurements. However, if M is "0" or "1", then the misfire rate $R_J$ of the cylinder is updated in steps 306 and 308.

Specifically, in step 306, the misfire measurement rate $R_J$ of the particular cylinder is updated in accordance with the following formula:

$$R_J = (1-\alpha')R_J + \alpha'M.$$

All other cylinder rate measurements remain unchanged.

In step 308, the overall misfire rate $R_{TOT}$ 109 is updated in accordance with the following formula:

$$R_{TOT} = (1-\alpha)R_{TOT} + \alpha M.$$

The distinction between these formulas is the use of $\alpha'$ in Step 306 and the use of $\alpha$ in Step 308. Alternatively, this overall rate could be derived by averaging the individual cylinder misfire rates.

Figure 2:
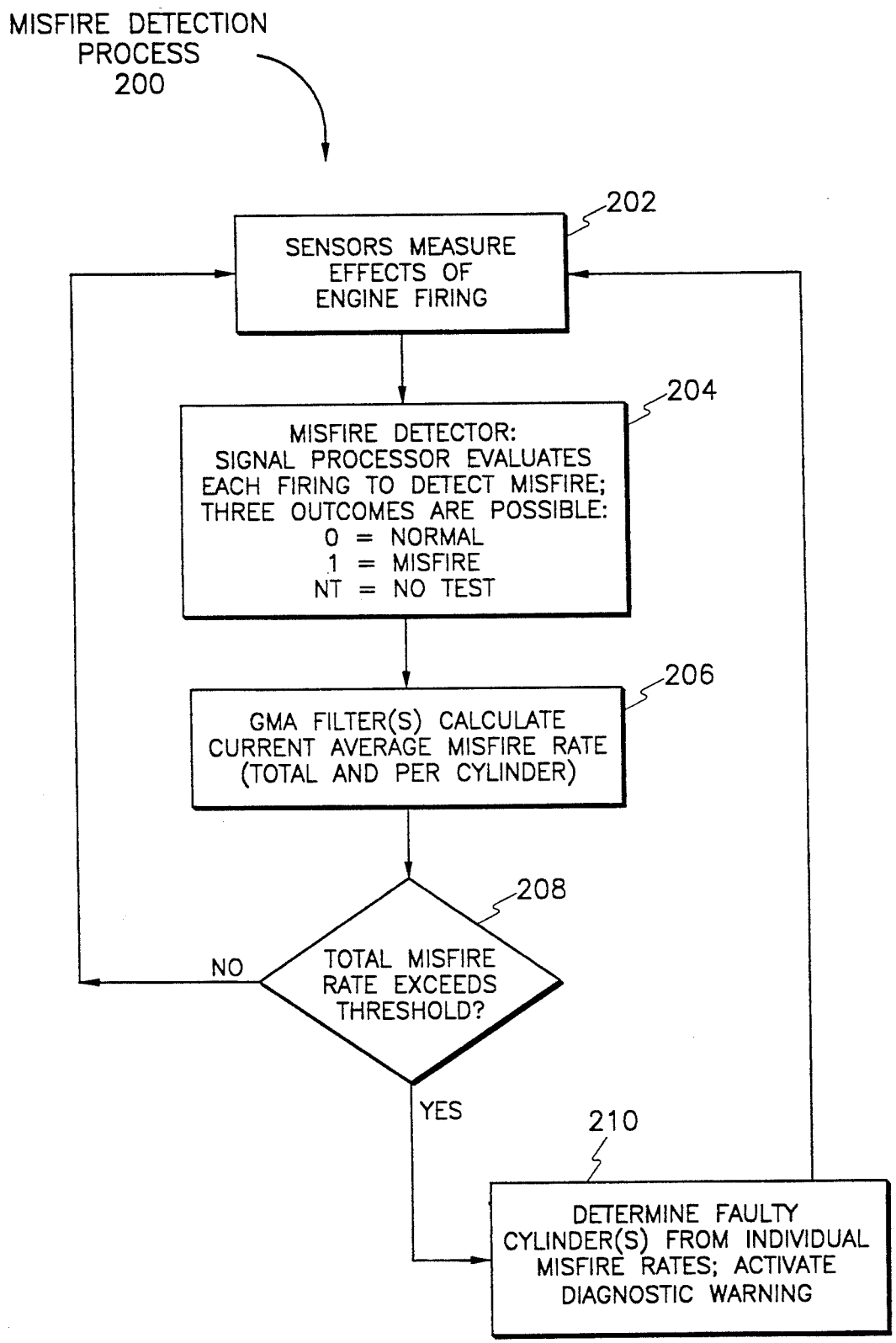
FIG. 2 is a flow chart illustrating the operation of the misfire detection system shown in FIG. 1.

In step 310, updated rates (misfire rate output measurements) 109 are sent to comparator 110 which operates in accordance with step 208 of FIG. 2 (described above).

Neither the FWA filter nor the GMA filter requires memory of past detector output patterns, but the GMA filter 108 of the present invention has two main advantages over FWA filters under virtually all conditions appropriate to misfire detection: (1) the GMA filter 108 provides more optimal response time in notifying the on-board diagnostics of unacceptably high misfire rates; and (2) the GMA filter 108 is better at filtering out occasional errors from the misfire detector which inevitably result from system noise. Both of these advantages are due to the fact that the GMA filter 108 yields an output equivalent to a weighted average of all previous misfire detector outputs whose weights decay geometrically with time. Consequently, response time is improved since (1) misfire rate measurements are updated at each firing, and (2) relatively high weight is attached to recent detector outputs. Additionally, by weighting previous outputs geometrically, the probability that false alarms will cause a false indication of failure is reduced.

Figure 8A:
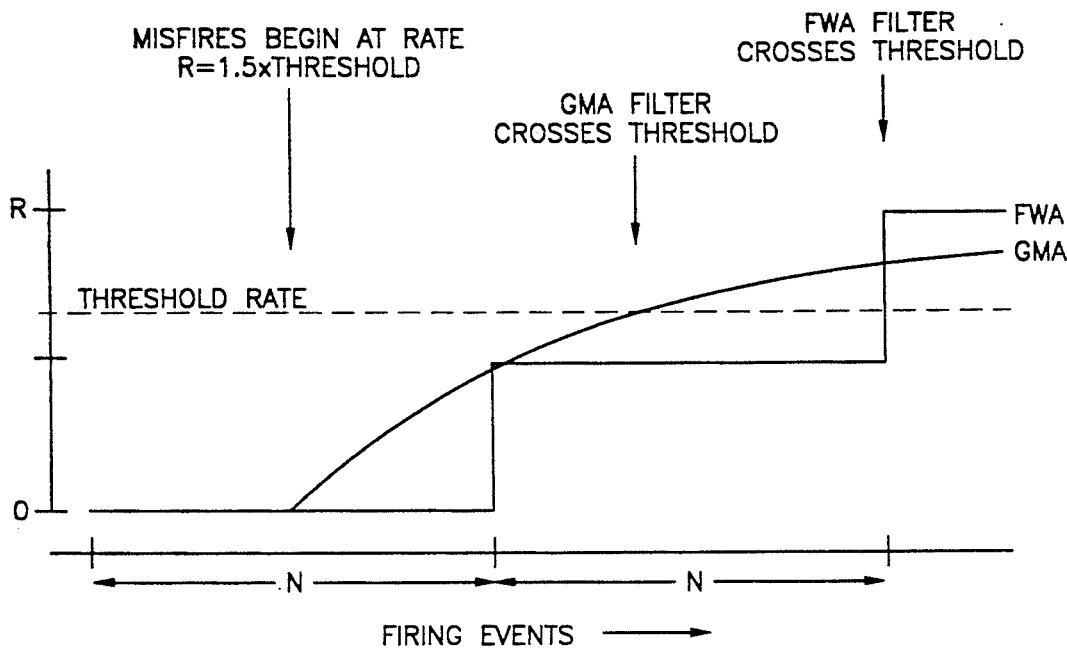
FIGS. 8a–8e depict graphs illustrating the advantages of the present invention.
Figure 8B:
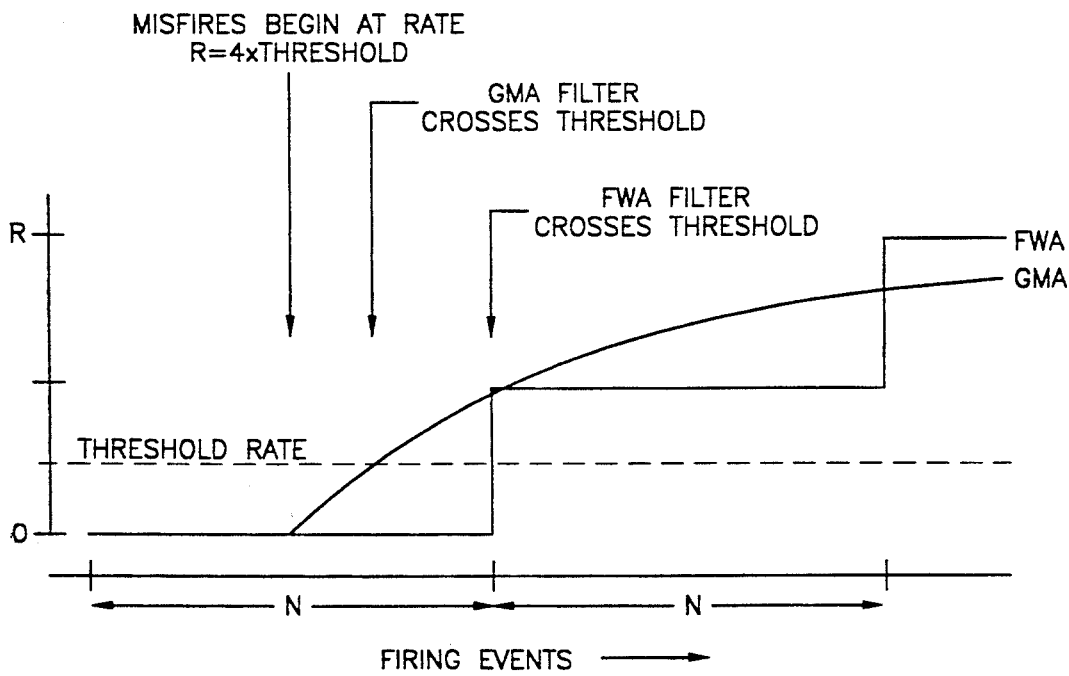
Figure 8C:
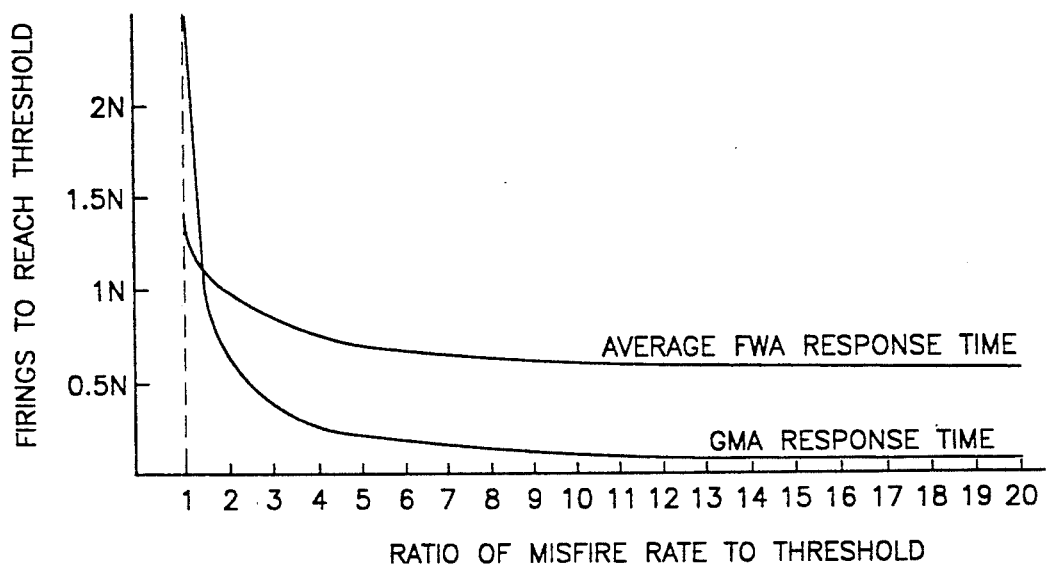

These advantages of the GMA filter 108 of the present invention, and the operational differences between the GMA filter 108 and FWA filters, are illustrated in FIGS. 8a, 8b and 8c.

FIGS. 8a and 8b show the outputs of the FWA and GMA filters plotted against time (measured in firing events) following the sudden onset of misfire at a constant rate. For purposes of comparison, the onset of misfire in these figures occurs at the midpoint of a window, somewhere between the best and worst cases. The FIGS. 8a and 8b illustrate how the ratio of misfire rate to threshold rate affects the response time of both filters. It is apparent that the FWA lags in reaching the threshold because it must wait until the end of a window in order to update misfire rate measurements. Because the GMA filter updates its output after each firing, it responds much faster than the FWA to sudden large increases in misfire rate.

FIG. 8c compares response time for the two filters as a function of the ratio of misfire rate to threshold rate. The response time, in terms of number of firings to threshold, for either filter is directly proportional to that filter's characteristic parameter, i.e., the window length N for the FWA and the time constant $\tau$ for the GMA. (In this and following figures, $\tau = N$). The FWA response time shown in FIG. 8c is the average obtained by letting the position of misfire onset vary over the entire window. (Not shown in FIG. 8c are the worst and best case response times for the FWA which lie 0.5N above and below the average.) When misfire rates are significantly above the threshold, the GMA response time is significantly faster than that of the FWA. The GMA is actually slower responding to misfire rates slightly above the threshold; but it is precisely this behavior that allows the GMA to perform better than FWA in protecting against false indication of failure.

Figure 8D:
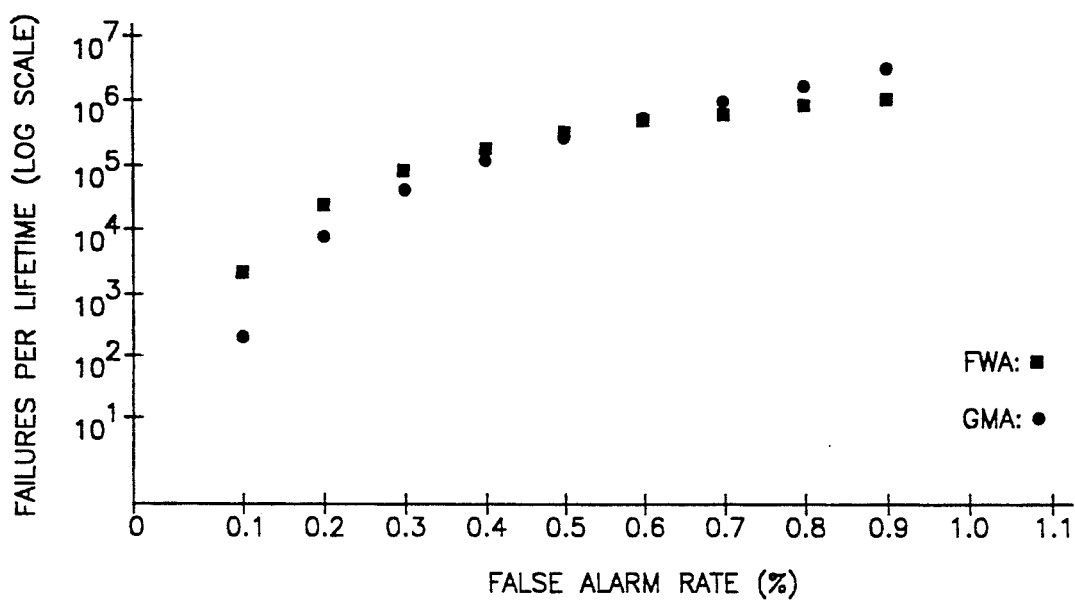
Figure 8E:
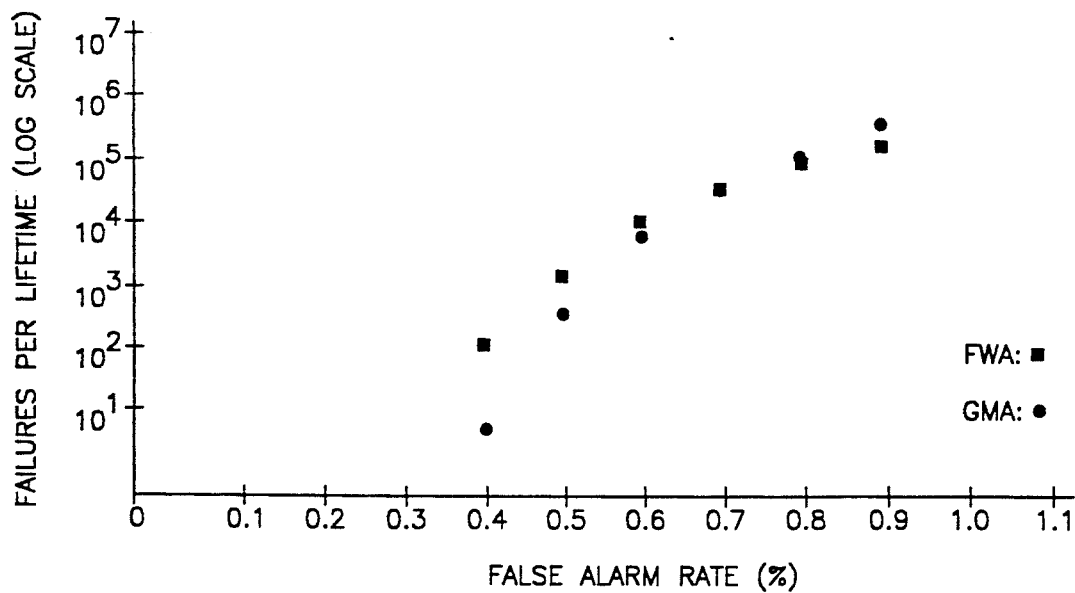

FIGS. 8d and 8e contain the results of computer simulations which confirm the GMA filter's better performance. In these tests, the computer simulates the misfire detector output with randomly occurring instances of false alarm in the absence of true misfires. The probability that a false alarm occurs is determined by a random variable with expectation value representing the false alarm rate used in each simulation. The thresholds for both filters are set to 1%.

The results in FIG. 8d are based on a time constant of 400; results in FIG. 8e are based on a time constant of 2000. The y-axis of each plot is a logarithmic scale of the average number of times each filter crosses the 1% threshold during a simulated car lifetime (1 billion firings). As the false alarm rate increases from 0.1% to 0.9%, the number of failures per lifetime increases by many orders of magnitude. However, for false alarm rates below 0.6%, the GMA filter produces fewer failures than the FWA filter. For false alarm rates near or above 0.6%, both filters produce far more failures than could ever be tolerated in a production system. In general, the maximum acceptable false alarm rate depends strongly on system parameters such as the detection threshold and time constant. The impact of the latter parameter is seen in the comparison of FIG. 8d and FIG. 8e.

3.0 Background loop implementation of the GMA filter

The previous section discussed the implementation and advantages of the GMA filter 108. Although GMA filter 108 performs better than conventional FWA filters 108 under the vast majority of circumstances, it is somewhat more computationally demanding of the real-time processors commonly used for engine control and diagnostics (as will be appreciated by those skilled in the art, the processors used in automotive engine control and diagnostic systems are typically limited in functionality and processing power).

Specifically, the GMA filter 108 described above operates in accordance with the GMA process 300 (see FIG. 3) which executes once for each and every engine firing event. In accordance with an alternative embodiment of the present invention, the bulk of the GMA filtering process is transferred to portion of code which executes less frequently than once per firing and, consequently, which is less processor intensive. Other automobile control and diagnostic functions (such as spark timing and fuel injection pulse width) may continue to operate on a per firing basis. Such a division between processes which execute once per firing (called "foreground" processes herein) and those which execute less often (called "background" processes herein) is generally well known in the art.

Figure 4:
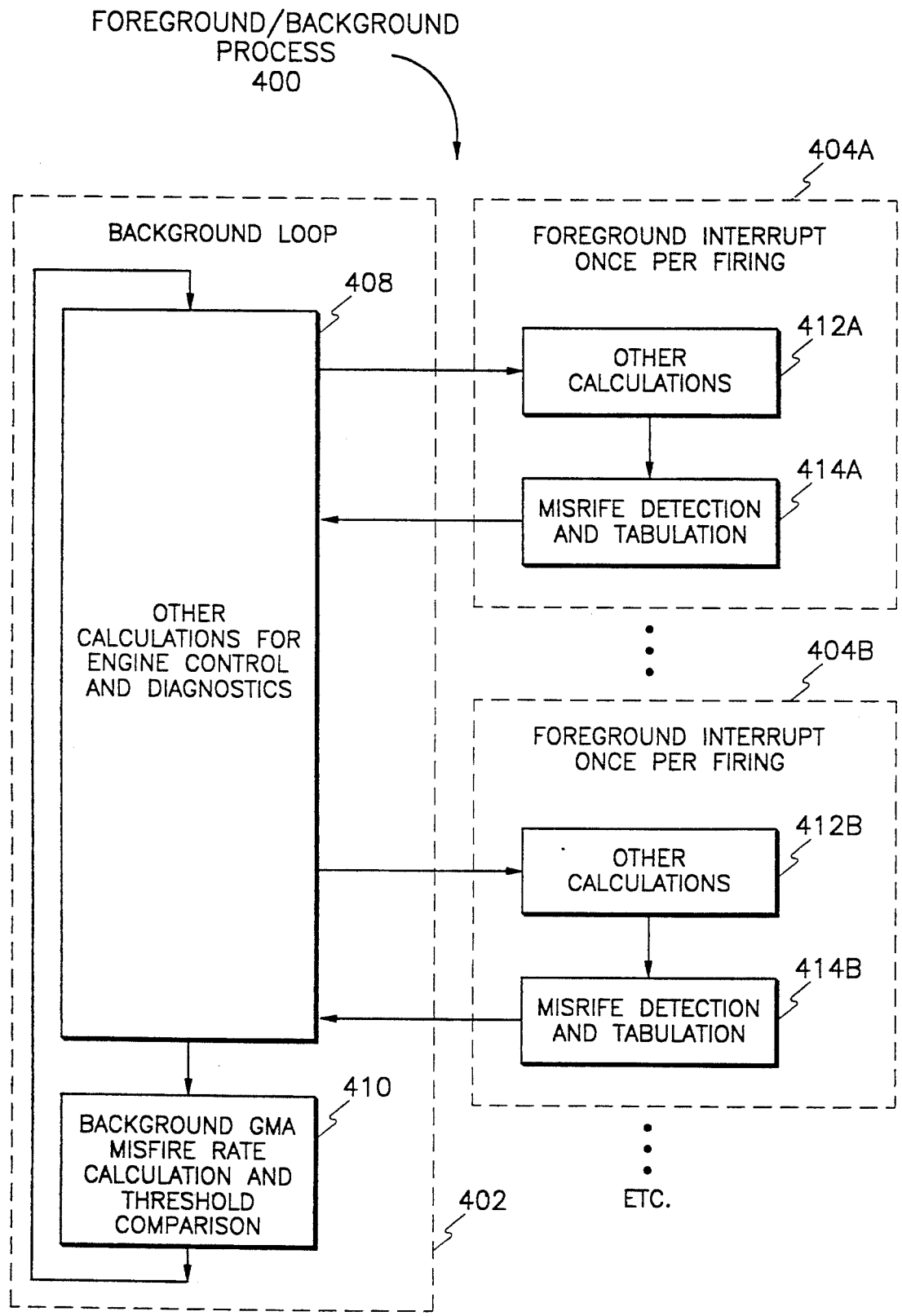
FIG. 4 is a block diagram of a misfire detection system in accordance with an alternative embodiment of the present invention.

FIG. 4 depicts a misfire detection process 400 in accordance with an alternative embodiment of the present invention. The process 400 includes a background loop procedure block 402 and foreground procedure blocks 404A, 404B, etc. The foreground blocks 404 each have the same process steps. Multiple foreground blocks 404 are shown in FIG. 4 to indicate that the process steps in the foreground blocks 404 execute multiple times for each iteration of the background loop 402. The foreground procedures 404 are invoked on an interrupt basis as each engine firing occurs. In contrast the execution of the background loop 402 is not related to engine firings, and may iterate only once during an interval containing multiple engine firings. Upon completion of the foreground interrupt tasks 404, the logic flow reverts to the point within the background loop 402 from where the interrupt first occurred. Because multiple interrupts typically occur during each pass through the background loop 402 (especially at high engine speed), moving a procedure from the foreground loop 404 to the background loop 402 saves significant computational time in the overall process 400.

In the alternative embodiment of the present invention, the GMA filter 108 is transferred from the foreground 404 to the background 402 and is depicted as block 410 in FIG. 4. Other portions of the misfire detection process (shown as block 414 in FIG. 4) remain in the foreground 404. Specifically, the portion of the misfire detection and tabulation process which remains in the foreground loop 404 is identical to that required when implementing the FWA filter (which is inherently a background process). During step 412 other automobile control and diagnostic functions (such as spark timing and fuel injection pulse width) are performed on a per firing basis.

Figure 5:
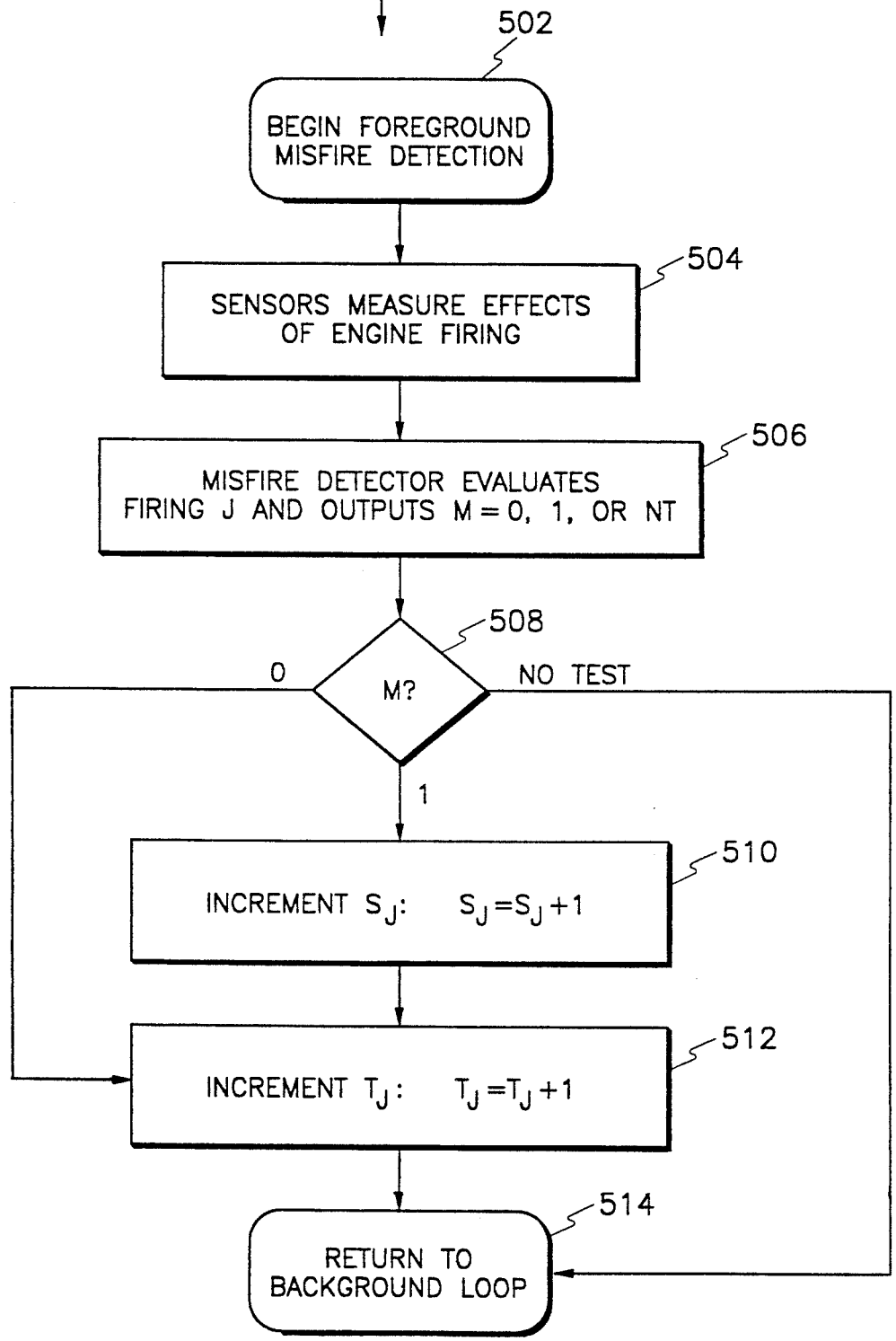
FIGS. 5 and 6 are flow charts illustrating the operation of the misfire detection system of FIG. 4.

The misfire detection and tabulation process 414 is shown in greater detail in FIG. 5. Block 504 is equivalent to block 202 and block 506 is equivalent to block 204, as previously described above with reference to FIG. 2. However, in lieu of filtering the data stream in the foreground 404, blocks 508 through 512 sum up and store the number of successful misfire evaluations (that is, $M=1$ or 0) per cylinder for subsequent use in the background GMA filter 410. The number of misfires are summed in step 510 and stored in variables $S_J$, where $J=1$ to 6 for a 6-cylinder engine. The number of successful evaluations (either misfire or normal) are summed in step 512 and stored in variables $T_J$, where $J=1$ to 6.

Figure 6:
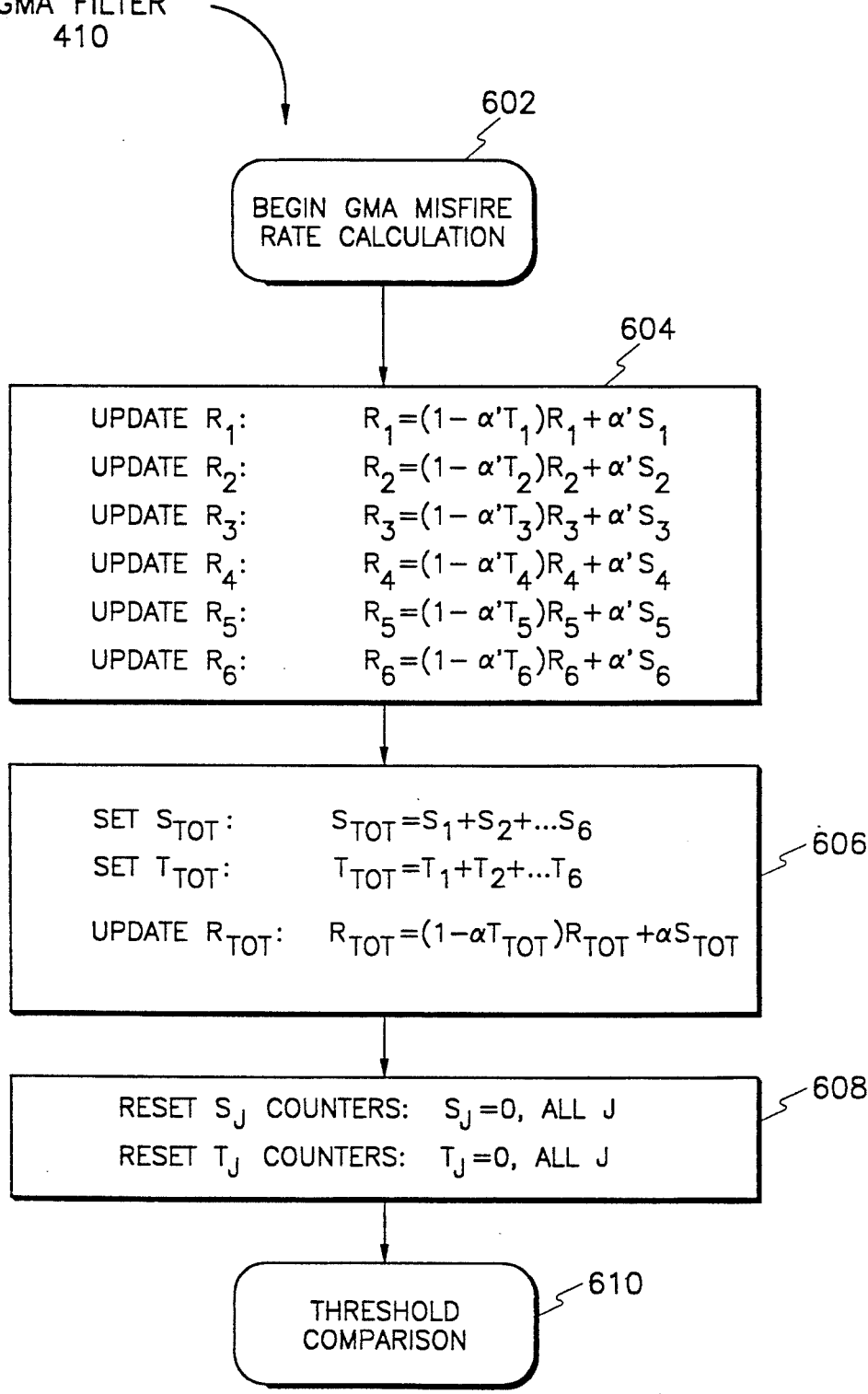

The background GMA filter 410 is shown in greater detail in FIG. 6. In step 604, a separate misfire rate calculation is performed for each cylinder (6-cylinder engine is assumed in FIG. 6). The equations are reminiscent of those used in the foreground GMA (i.e. step 306). except that in step 604 the total number of successful evaluations for the $J^{th}$ cylinder, since the last execution of the background GMA filter 410 affects the amount of decrease in the value of $R_J$ via the term $(1-\alpha' T_J) R_J$, and the total number of misfires detected in the cylinder determines the increase in the value of $R_J$ through the term $(\alpha' S_J)$.

In step 606, the GMA filter 410 sums the total number of misfires ($S_{TOT}$) and successful evaluations ($T_{TOT}$) over all cylinders. Also, the GMA filter 410 uses $S_{TOT}$ and $T_{TOT}$ to calculate the overall misfire rate ($R_{TOT}$). An alternate form of calculating $R_{TOT}$ utilizing the arithmetic mean of the current set of $R_J$ values may alternatively used in step 606.

In step 608, the background GMA filter 410 resets all of the counters $S_J$ and $T_J$ to zero, so that they may accumulate new values within the foreground misfire detection loops 404 during the next iteration of the background loop 402.

In step 610, the background GMA process 410 compares $R_{TOT}$ with a predetermined threshold. Step 610 is similar to step 208 of FIG. 2. Also, the definitions of $\alpha$ and $\alpha'$ are the same as previously established.

Figure 9A:
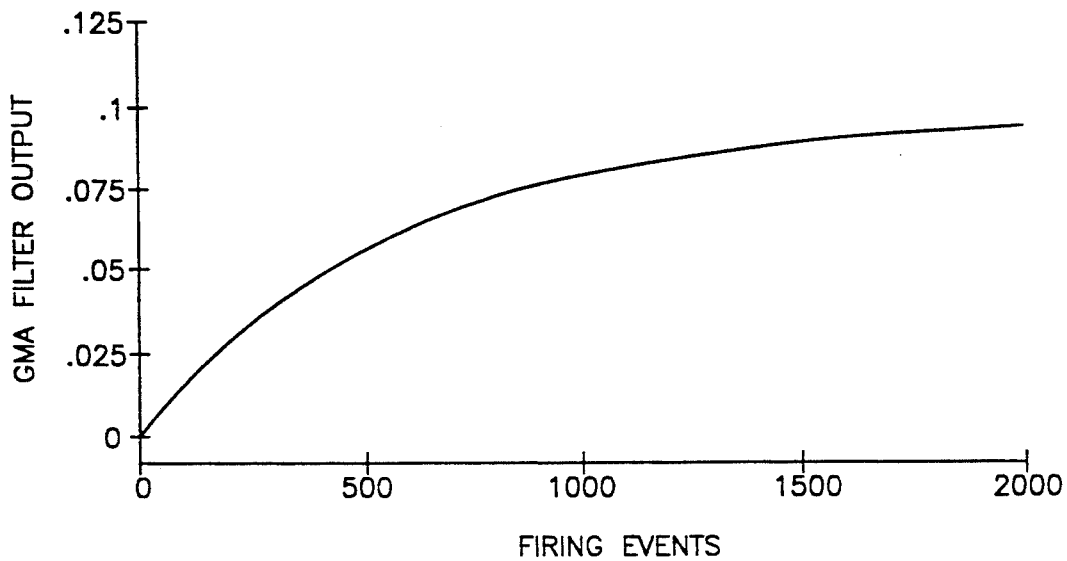
FIGS. 9a and 9b depict graphs illustrating the performance of the misfire detection system of FIG. 4.
Figure 9B:
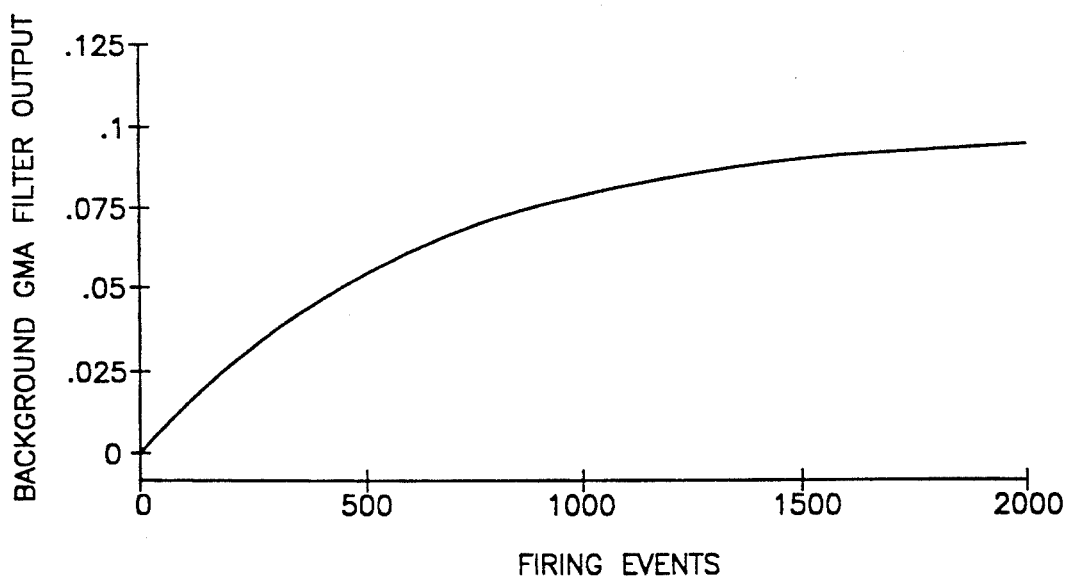

FIGS. 9a and 9b show a behavioral comparison of a system using the background GMA filter 410 with that of a system using the foreground GMA filter 108, under the conditions used for FIG. 8a earlier. The only additional parameter needed to simulate the background GMA response is the number of successful foreground misfire evaluations which occur during each background loop (designated $T_{TOT}$ in step 606). Although in actual practice $T_{TOT}$ varies with engine speed and strategy, the simulation depicted in FIGS. 9a and 9b fixes $T_{TOT}$ at 20 foregrounds per background, quite likely a "worst case" scenario. With a time constant of $\tau=600$, the two plots in FIGS. 9a and 9b track each other very well. As indicated by the background GMA equation for $R_{TOT}$ in block 606, the background GMA filter 410 will closely approximate the foreground GMA filter 108 when the term $\alpha T_{TOT}$ is much less than one. Since $\alpha=1/\tau$, this statement is equivalent to the requirement that the number of foreground loops be much less than the filter constant $\tau$, which is easily satisfied for typical values of $\tau$. Thus, the background GMA updates its output after fewer than several dozen firings, much more frequently than FWA, which produces a new misfire value only after hundreds or thousands of firings, depending on the window width. The nearly identical responses of the background GMA filter 410 and foreground GMA filter 108 indicate that the background GMA filter 410 achieves the same advantages of the foreground GMA filter 108, described above.

While preferred embodiments of the invention have been shown and described herein, it will be understood that such embodiments are provided by way of example only. Numerous variations, changes, and substitutions will occur to those skilled in the art without departing from the spirit of the invention. Accordingly, it is intended that he appended claims cover all such variations as fall within the spirit and scope of the invention.

What is claimed is:

1. A misfire detection system for measuring whether a multiple cylinder combustion engine is misfiring beyond acceptable threshold levels, comprising:

sensing means, coupled to the engine, for measuring firings of each cylinder of the multiple cylinder engine during operation of the engine; misfire detector means, coupled to said sensing means, for processing the signals received from said sensing means, for producing a current misfire detection data stream of first and second logic signals, wherein said first logic signals indicate a current misfire condition and said second logic signals indicate a current normal firing of the engine;

geometric filter means, coupled to said misfire detector means, for receiving said current misfire detection data stream, for combining said current misfire detection data stream with previously detected and stored measured data representing an engine misfire rate and for replacing the previously stored measured data by said combined current and previously stored data to produce a misfire rate output measurement;

storage means for storing threshold values;

comparator means, coupled to said geometric filter means and to said storage means, for comparing said combined current and previously stored data and said stored threshold values and for generating an actuation signal if said combined current and previously stored data exceed said stored threshold values; and a diagnostic indicator, coupled to said comparator means, for indicating a misfire condition in the engine upon receiving said actuation signal produced by said comparator.

2. The misfire detection system of claim 1, wherein said geometric filter comprises means for generating a misfire rate output measurement for an individual cylinder of said multiple cylinder engine.

3. The misfire detection system of claim 2, wherein said geometric filter generates said misfire rate output measurement for said individual cylinder of said multiple cylinder engine in accordance with:

$$R = (1 = NA)R + NAM;$$

wherein R is said misfire rate output measurement of the individual cylinder, M is said current misfire detection data stream, A is the inverse of a predetermined time constant, and N is the number of cylinders of the multiple cylinder engine.

4. The misfire detection system of claim 1, wherein said geometric filter comprises means for generating a total misfire rate output measurement for the multiple cylinder engine.

5. The misfire detection system of claim 4, wherein said geometric filter generates said total misfire rate output measurement for said multiple cylinder engine in accordance with:

$$R = (1 - A)R + AM;$$

wherein R is said total misfire rate output measurement for said multiple cylinder engine, M is said current misfire detection data stream, and A is the inverse of a predetermined time constant.

6. A method for filtering a misfire data stream having numerical values that indicate whether a firing of a cylinder was a misfire or a proper firing, to yield an optimum measurement misfire-rate for accurate and rapid determination of whether an engine is misfiring beyond a threshold level, comprising the steps of:

(a) measuring firings of the cylinder during operation of the engine to produce measured cylinder firing signals;

(b) processing the measured cylinder firing signals received to produce a current misfire detection data stream of first and second logic signals, wherein said first logic signals indicate a current misfire condition and said second logic signals indicate a current normal firing of the engine;

(c) combining said current misfire detection data stream with previously detected and stored measured data representing an engine misfire rate;

(d) replacing the previously stored measured data by said combined current and previously stored data to produce a misfire rate output measurement;

(e) storing threshold values;

(f) comparing said combined current and previously stored data and said stored threshold values;

(g) generating an actuation signal if said combined current and previously stored data signal exceeds said stored threshold values; and (h) indicating a misfire condition in the engine upon receiving said actuation signal.

7. A misfire detection system for measuring whether a multiple cylinder combustion engine is misfiring beyond acceptable threshold levels, comprising:

sensing means, coupled to the engine, for measuring firings of each cylinder of the multiple cylinder engine during operation of the engine;

misfire detector means, coupled to said sensing means, for processing the signals received from said sensing means, for producing a current misfire detection data stream of first and second logic signals, wherein said first logic signals indicate a current misfire condition and said second logic signals indicate a current normal firing of the engine;

means, coupled to said misfire detector means, for summing, the first logic signals and the second logic signals for each of cylinder of the multiple cylinder engine;

means for generating an interrupt signal upon the occurrence of each of said firings to thereby activate said sensing means, said misfire detector means and said summing means;

geometric filter means, coupled to said summing means, for receiving said summed first and second logical signals, for combining said summed first and second logical signals with previously detected and stored measured data representing an engine misfire rate and for replacing the previously stored measured data by said combined summed first and second logical signals and previously stored data to produce a misfire rate output measurement;

storage means for storing threshold values;

comparator means, coupled to said geometric filter means and to said storage means, for comparing said combined current and previously stored data and said stored threshold values and for generating an actuation signal if said combined current and previously stored data exceed said stored threshold values; and a diagnostic indicator, coupled to said comparator means, for indicating a misfire condition in the engine upon receiving said actuation signal produced by said comparator.

* * * * *